H. A. HARVEY.
Bolts and Nuts.
No. 154,864.  Patented Sept. 8, 1874.
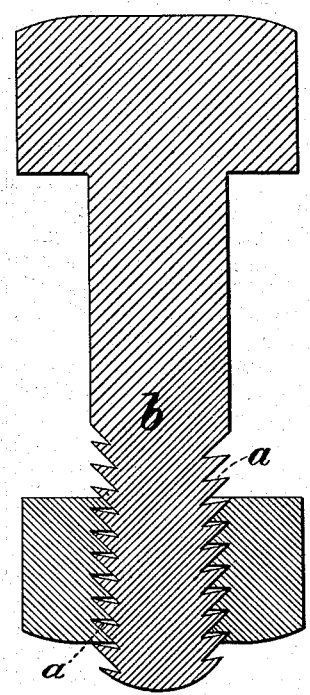
Witnesses:
Edw? Payson
Geo. W. Miatt
Inventor:
H. A. Harvey
Per Edw. E Quimby
Atty.

UNITED STATES PATENT OFFICE.

HAYWARD A. HARVEY, OF ORANGE, NEW JERSEY.

IMPROVEMENT IN BOLTS AND NUTS.

Specification forming part of Letters Patent No. 154,864, dated September 8, 1874; application filed March 6, 1874.

*To all whom it may concern:*

Be it known that I, HAYWARD A. HARVEY, of Orange, New Jersey, have invented certain Improvements in Bolts and Nuts, of which the following is a specification:

My invention relates to bolts and nuts having threads of the kind known as ratchet or barbed threads; and consists in forming the bearing-surface of the thread of one at a different angle from that of the bearing-surface of the other, so that when the device is tightened upon an object the thread of the one shall bear upon the thread of the other at its outer edge only, the object being to make the frictional bearing greatest at the outer edge, preferably, of the bolt-thread, so that the nut, when screwed home, will resist dislodgment with greater energy than when the ordinary V-thread is used.

The accompanying drawing is a longitudinal section of a bolt and nut embodying my improvement.

It will be seen that the upper side $a$ of the thread upon the bolt inclines slightly toward the shank $b$, and that the corresponding side of the nut-thread is at a right angle with the shank. By means of a ratchet-thread a spiral plane is presented substantially at a right angle to the direction of resistance. The inclination of the upper side $a$ makes what I call a "barb-thread" on the bolt; and the object of this inclination, in conjunction with the ratchet-thread of the nut, is to insure the bearing of the extreme edge of the male or bolt thread upon the nut-thread, so as to make that the point of greatest friction.

Of course, the angles of the threads may, if desired, be respectively reversed without substantially changing the general effect I seek to produce.

I am aware that ratchet-threaded screws are not new; but I do not know of an example of the combination of threads of different angles in a nut and bolt.

I claim as my improvement—

In a combined screw bolt and nut that have threads of the kind known as ratchet or barbed threads, threads so formed that the bearing-surface of one thread will be at a different angle from that of the bearing-surface of the other, so that when the device is tightened upon an object the thread of the one shall bear upon the thread of the other at its outer edge only, substantially as shown and described.

H. A. HARVEY.

Witnesses:
 J. H. WHITELEGGE,
 GEO. W. MIATT.